(12) United States Patent
Hirabayashi (10) Patent No.: US 7,569,960 B2
(45) Date of Patent: Aug. 4, 2009

(54) YOKE ASSEMBLY FOR STATOR OF STARTER MOTOR

(75) Inventor: Takashi Hirabayashi, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/010,157

(22) Filed: Jan. 22, 2008

(65) Prior Publication Data

US 2008/0185929 A1   Aug. 7, 2008

(30) Foreign Application Priority Data

Jan. 31, 2007   (JP) .............................. 2007-022361

(51) Int. Cl.
*H02K 21/26* (2006.01)

(52) U.S. Cl. .............................. 310/154.08; 310/154.14; 310/154.15

(58) Field of Classification Search ............ 310/154.01, 310/154.03, 154.08, 154.09, 154.12, 154.14, 310/154.15, 154.17, 154.27, 154.35, 154.36, 310/154.42

See application file for complete search history.

(56) References Cited

U.S. PATENT DOCUMENTS

| | | | |
|---|---|---|---|
| 6,376,956 B1* | 4/2002 | Hosoya | 310/154.17 |
| 2002/0063485 A1* | 5/2002 | Lee et al. | 310/154.15 |

FOREIGN PATENT DOCUMENTS

JP   A-09-168245   6/1997

* cited by examiner

*Primary Examiner*—Dang D Le
(74) *Attorney, Agent, or Firm*—Oliff & Berridge, PLC (57) ABSTRACT

A yoke assembly for a stator of a starter motor is disclosed including auxiliary poles and magnet springs, with each of auxiliary poles and each of the magnet springs taking the form of a subassembly. The subassembly, composed of each of the auxiliary poles preliminarily mounted on each of the magnet springs, is fixedly secured to an inner peripheral wall of a yoke. This allows the subassemblies to be easily assembled to the yoke in the same process as that in which a yoke assembly is assembled using the magnet springs in the absence of the auxiliary poles, providing assembling processes in common with an increase in mass production effect.

7 Claims, 8 Drawing Sheets

YOKE ASSEMBLY FOR STATOR OF STARTER MOTOR

CROSS REFERENCE TO RELATED APPLICATIONS

This application is related to Japanese Patent Application No. 2007-22361, filed on Jan. 31, 2007, the content of which is hereby incorporated by reference.

BACKGROUND OF THE INVENTION

1. Technical Field of the Invention

The present invention relates to stators for starter motors mainly for use in starting up automotive engines and, more particularly, to a yoke assembly for a stator of a starter motor having a cylindrical yoke whose inner peripheral wall carries thereon magnet springs each of which supports a stator element composed of a permanent magnet, serving as a main pole, and an auxiliary pole placed adjacent to the permanent magnet on an increasing magnetic flux side thereof.

2. Description of the Related Art

Attempts have heretofore been made to use a D.C. motor as a magnetic-field type starter employing a permanent magnet. With such a motor, a stator includes a cylindrical yoke having an inner peripheral wall that carries thereon a plurality of axially extending magnet springs (resilient holder elements) each formed in a nearly U-shape in cross section and opened toward a center of the yoke. The magnet springs support thereon stator elements, respectively. With such a structure, if each of the stator elements employs an auxiliary pole held in contact with the permanent magnet (main pole) on an increasing magnetic flux side thereof, the starter motor can have an improved rotational speed in a low current area without causing any drop in output torque in a high current area. This makes it possible to provide improved startability at a normal temperature as disclosed in Japanese Patent Application Publication 9-168245.

With the starter motors of the related art including the stator element comprised of the main poles and the auxiliary poles, a yoke assembling has been performed by assembling the yoke in two methods including: a method of fixedly securing the magnet springs on the yoke at the inner peripheral wall thereof after which the main pole and the auxiliary pole are simultaneously assembled to the yoke; and another method of preliminarily fixing the auxiliary poles onto the yoke by welding for assembly. Therefore, this results in a need to take an assembling process that is different from a yoke assembling for a structure employing only main poles in the absence of the auxiliary poles.

As a result, when manufacturing starter motors of two types such as a starter motor on which the stator elements having the auxiliary poles are mounted and a starter motor on which only the main poles are mounted, plural assembling processes are needed, resulting in a difficulty of achieving a reduction in manufacturing cost on mass production.

SUMMARY OF THE INVENTION

The present invention has been completed with a view to addressing the above issues and has an object to provide a yoke assembly for a stator of a starter motor wherein auxiliary poles and magnet springs are preliminarily arranged in subassemblies whereby the assembling of a yoke assembly of a starter motor, including stator elements comprised of main poles and the auxiliary poles, can be assembled on nearly the same assembling process as that of a yoke assembly of a starter motor including stator elements comprised of only the main poles.

To achieve the above object, the present invention provides a yoke assembly for a stator of a starter motor, comprising a cylindrical yoke having an inner peripheral wall, a plurality of subassemblies including magnet springs and auxiliary poles, with each of the magnet springs and each of the auxiliary poles being assembled to each other in advance after which the subassemblies are fixedly secured to the inner peripheral wall of the yoke at circumferentially and equidistantly spaced positions thereof, and a plurality of stator elements, each composed of a main pole made of a permanent magnet, which are fixedly secured to the inner peripheral wall of the yoke and each of which is fixedly retained with adjacent magnet springs. Each of the magnet springs includes a back plate, fixedly secured to the inner peripheral wall of the cylindrical yoke, and side plates radially extending from the back plate toward the center of the cylindrical yoke, with the back plate and the side plates formed in a nearly U-shape in cross section and opening toward the center of the cylindrical yoke. Each of the auxiliary poles is supported with one of the side plates and held in contact with the main pole on a side increasing magnetic fluxes.

With the yoke assembly for the starter motor of the present embodiment, the auxiliary pole and the magnet spring are unitized as the subassembly, making it possible to assemble the auxiliary pole and the magnet spring in the same process in which a magnet spring of a stator motor in the absence of an auxiliary pole is assembled. Thus, the assembling processes can be performed in common arrangement, resulting in improved mass production effect and reduction in manufacturing cost.

With the yoke assembly for a stator of a starter motor of the present embodiment, each of the subassemblies may be preferably unitized such that one of each auxiliary pole and each magnet spring has a concaved portion and the other has a convexed portion with the concaved portion and the convexed portion being held in mating engagement with each other.

With such a structure, the auxiliary pole and the magnet spring can be assembled to each other by simply causing the concaved portion and the convexed portion to be brought into mating engagement with each other. This enables the subassembly to be assembled to the yoke at low cost.

With the yoke assembly for the starter motor, each of the subassemblies may be preferably unitized such that each of the auxiliary poles has a protrusion formed by embossing and each of the magnet springs has a mating hole formed by punching with the protrusion and the mating hole being held in mating engagement with each other.

The structure, in which the auxiliary pole has the protrusion formed by embossing and the magnet spring has the mating hole formed by punching, results in the work being performed with ease and a resultant excellent productivity. In this case, it is mostly practical to take a structure with two protrusions each formed in a circular shape and two mating holes each formed in a round shape, resulting in an excellent productivity and durability.

With the yoke assembly for the starter motor, the inner peripheral wall of the cylindrical yoke may have bulging portions formed at equidistantly spaced positions, each of the auxiliary poles is fixedly secured to an outside wall of one of the side plates of each magnet spring in direct contact with the main pole with the protrusion having a height nearly equal to a thickness of the side plate, and the back plate of each magnet spring has a fixture hole held in mating engagement with each of the bulging portions such that the magnet spring is positioned. Each of the bulging portions is plastically deformed to cause the back plate to be fixedly secured to the yoke.

With such a structure, the auxiliary pole is fixedly secured to the outside wall of the side plate of the magnet spring in direct contact with the main pole with the convexed portion having a height nearly equal to the thickness of the side plate. With the subassembly formed in such a unitized structure, almost no part of the convexed portion of the auxiliary pole projects to the inside of the magnet spring. The magnet spring is positioned on the inner peripheral wall of the yoke by fitting the fixture hole of the back plate of the magnet spring to each of the bulging portions formed in the yoke on the inner peripheral wall thereof in mating engagement with each other. Upon mating engagement of these associated component parts, the bulging portions, protruding from the back plate toward the center of the yoke, are plastically deformed (caulked) in flattened states, thereby fixedly securing the magnet spring onto the inner peripheral wall of the yoke.

In a preferable structure, the magnet spring has two rectangular fixture holes formed at longitudinally spaced positions and the bulging portions are formed on the inner peripheral wall of the yoke at longitudinally spaced positions in correspondence to the locations of such fixture holes so as to protrude radially inward to the center of the yoke. The bulging portions protrude from the back plate of the magnet spring under the mating states so as to extend toward the center of the yoke. Subsequently, protruded areas are caulked and expanded, thereby causing the magnet spring to be fixedly secured to the inner peripheral wall of the yoke. When caulking, almost no part of the protrusion of the auxiliary pole protrudes to the inward area of the magnet spring. This allows the use of the same caulking tool as that used for caulking the bulging portions of the yoke for the structure in the absence of the auxiliary poles, making it possible to perform caulking processes in common arrangement. This results in an advisable effect of achieving remarkably improved productivity at low manufacturing cost.

With the yoke assembly for the starter motor, the auxiliary pole may be preferably and fixedly secured to an outside wall of one of the side plates of each magnet spring in direct contact with the main pole with the protrusion having a height nearly equal to a thickness of the side plate, and each of the magnet springs internally has a mounting chamber, accommodating therein a pole-to-pole magnet, which has an opening portion opened toward the center of the yoke, and a holding section to hold the pole-to-pole magnet in the mounting chamber so as to allow the same to close the opening portion.

With the subassembly formed in such a structure, almost no part of the convexed portion of the auxiliary pole protrudes into the inside area of the magnet spring, thereby ensuring the magnet spring to have the same internal airspace as that achieved in a structure in the absence of the auxiliary poles.

Therefore, the yoke assembly of the present embodiment can have the same structure as that of a stator in which pole-to-pole magnets are assembled to a yoke in the absence of auxiliary poles. This enables the pole-to-pole magnets to be additionally incorporated into the inside (mounting chamber) of the magnet spring. Such a structure enables the yoke assembly to be smoothly assembled in a structure including both the auxiliary poles and the pole-to-pole magnets with a consequence of less leakage of magnetic fluxes between the main poles. This enables the starter of the starter motor with improved output performance to be realized at low cost.

DETAILED DESCRIPTION OF PREFERRED EMBODIMENTS

Now, yoke assemblies of various embodiments according to the present invention for use in a starter motor will be described below in detail with reference to the accompanying drawings. However, the present invention is construed not to be limited to such an embodiment described below and technical concepts of the present invention may be implemented in combination with other known technologies or the other technology having functions equivalent to such known technologies.

In the following description, like reference characters designate like or corresponding component parts throughout the several views. Also the following description, it is to be understood that such terms as "cylindrical", "inner", "outer", "axially", "peripheral", "circumferential", "equidistantly" and the like are words of convenience and are not to be construed as limiting terms.

First Embodiment

A yoke assembly of one embodiment according to the present invention for use in a stator of a starter motor mounted on an automotive engine is described below with reference to FIGS. 1 and 2.

Figure 1:
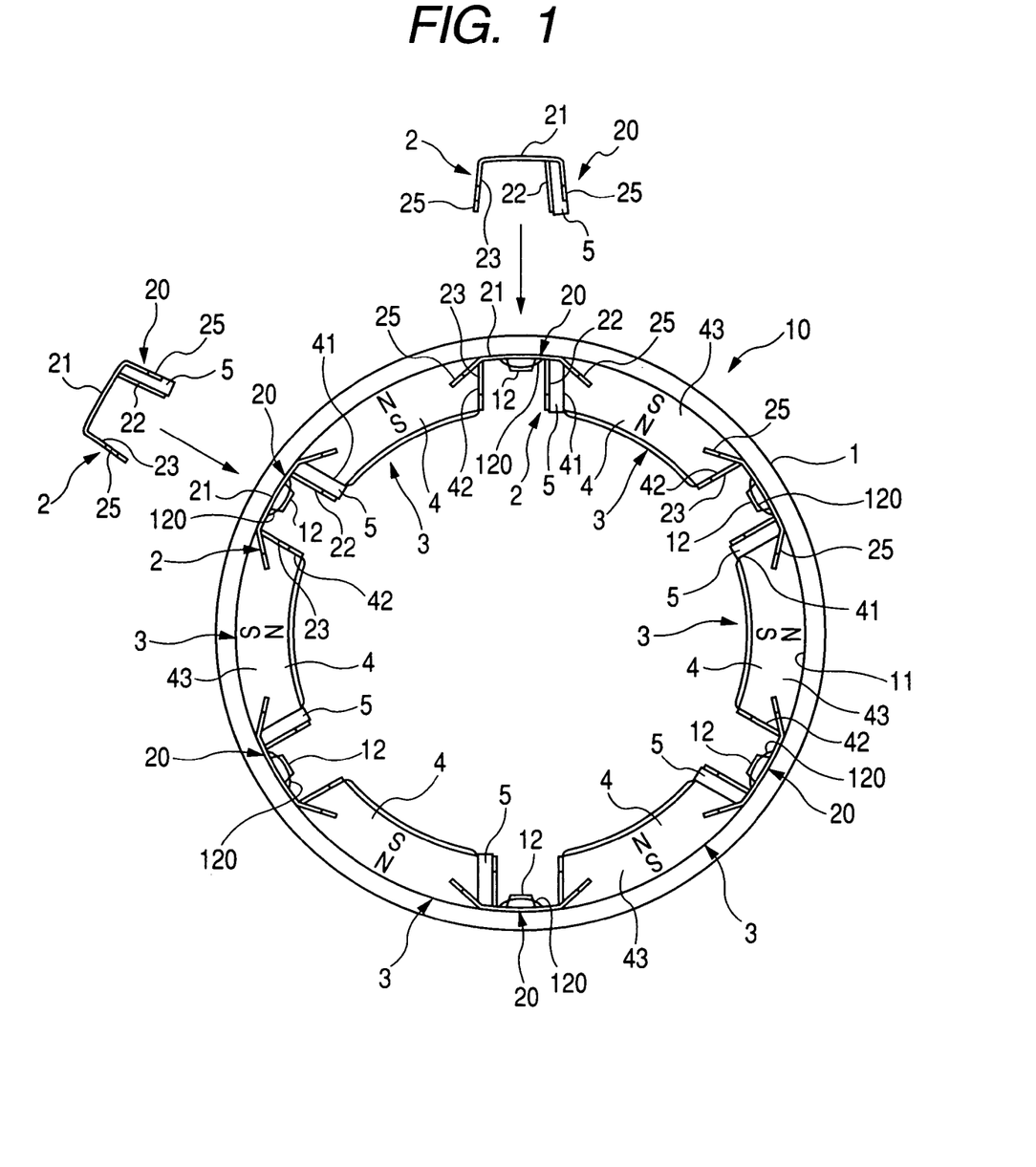
FIG. 1 is a side view showing a yoke assembly of one embodiment according to the present invention for use in a stator of a starter motor.
Figure 2:
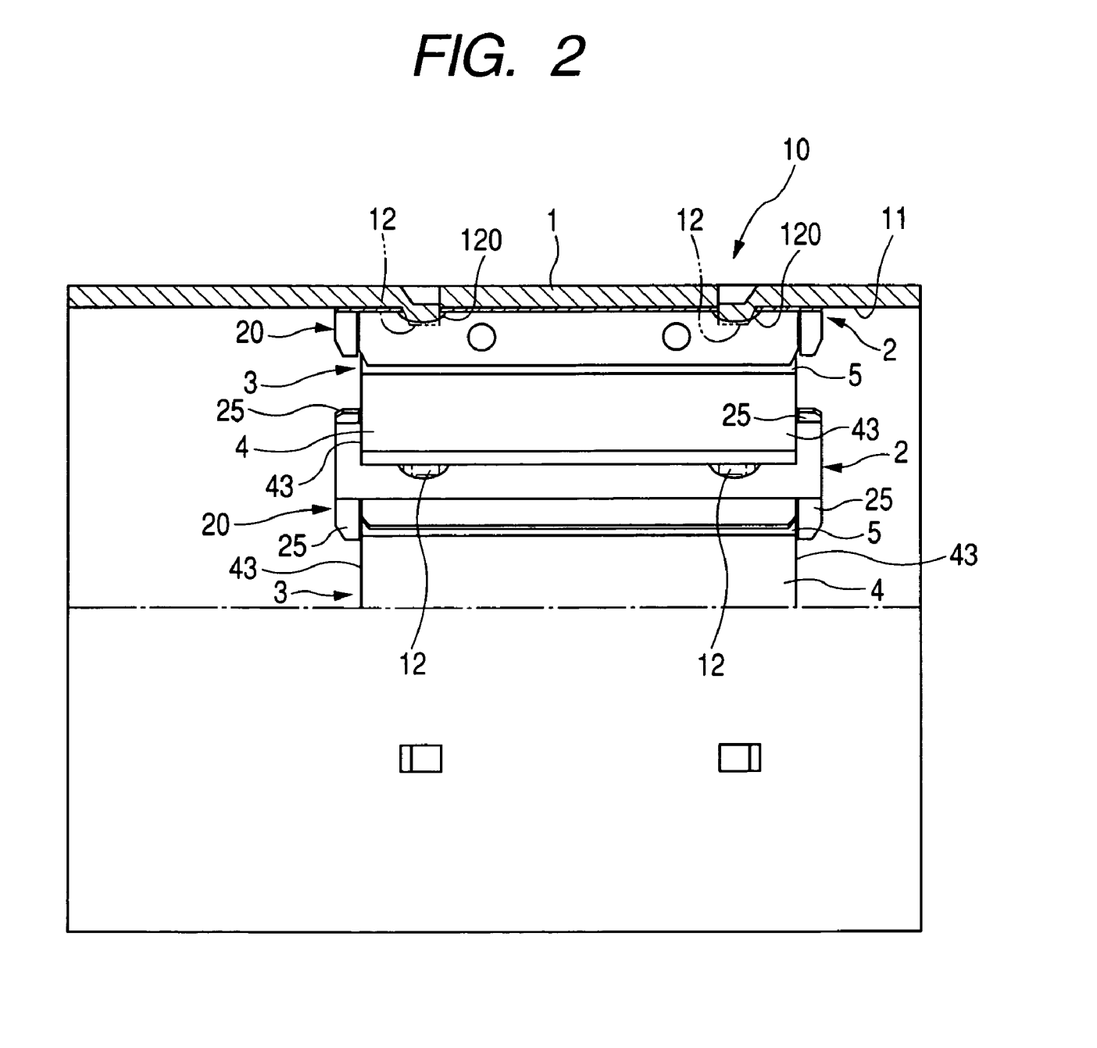
FIG. 2 is a front view of the yoke assembly partly in cross section in an upper half area.

As shown in FIGS. 1 and 2, the yoke assembly 10 includes a cylindrical yoke 1 having an inner circumferential periphery 11, a plurality of magnet springs 2 fixedly secured to the inner circumferential periphery 11 of the cylindrical yoke 7 at equidistantly spaced intervals along a circumferential direction of the inner circumferential periphery 11, and a plurality of stator elements 3 retained with the magnet springs 2, respectively. A fundamental structure of the starter motor to which the yoke assembly 10 is applied is well known in the art and an armature, having a rotary shaft (not shown), is coaxially accommodated in the yoke 1.

With the present embodiment, the inner peripheral wall 11 of the yoke 1 carries thereon six magnet springs 2, fixedly secured at circumferentially equidistantly spaced positions, between which six stator elements 3 are disposed and retained in fixed positions, respectively, with each stator element being circumferentially press forced between the associated magnet springs 2. The yoke 1 has six circumferentially spaced positions on which six pairs of radially inward bulging portions 12, 12 are formed in longitudinally (axially) spaced positions, respectively, by press forming for fixedly securing the magnet springs 2 onto the inner peripheral wall 11 of the yoke 1.

Each of the stator elements 3 includes a main pole 4, made of a permanent magnet and having a sector shape in cross section, and an auxiliary pole 5, made of an iron plate, which is held in abutting engagement with a side surface 41 of each main pole 4 on a magnet-flux increasing side. Symbols "N" and "S" represent pole orientations of the main pole 4. Also, although the auxiliary poles 5 do not serve as essential elements of the stator elements of the yoke assembly 10 of the present embodiment forming the starter motor, using the stator elements 3, each comprised of the main pole 4 and the auxiliary pole 5 held in direct contact with each other, allows the stator motor to have improved startability at a normal temperature as well known in the art. In addition, the number of stator elements 3 may be suitably selected depending on a demanded performance of the starter motor.

Figure 3A:
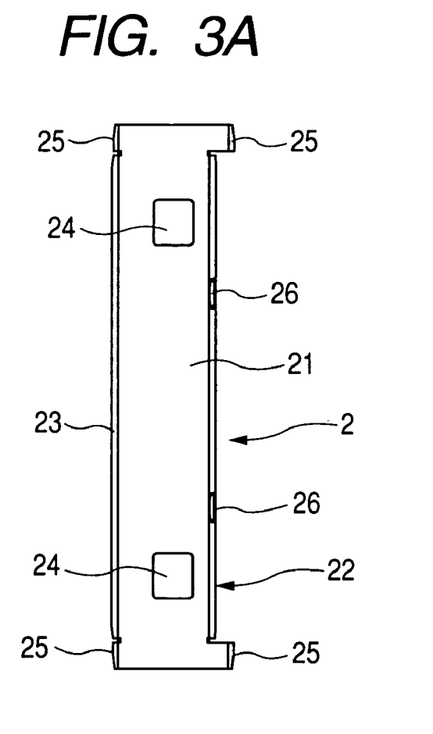
FIG. 3A is a plan view of a magnet spring forming part of the stator element shown in FIG. 1.
Figures 3B, 3C:
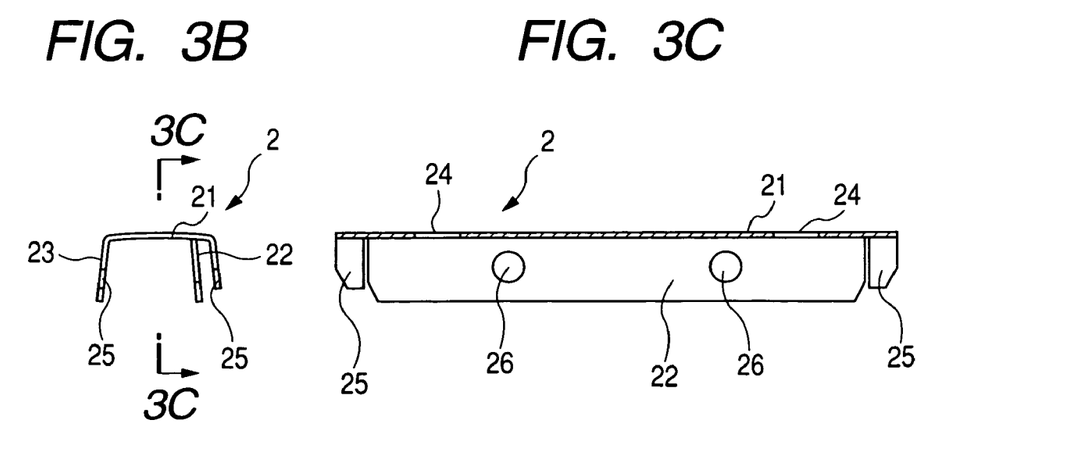
FIG. 3B is a side view showing the magnet spring shown in FIG. 3A.
FIG. 3C is a cross-sectional view taken on line 3C-3C of FIG. 3B.

Each of the magnet springs 2 takes the form of a tab made of a leaf spring formed in a nearly U-shape in cross section and is fixedly secured onto the inner peripheral wall 11 of the yoke 1 under a state opened radially inward toward the center of the yoke 1. As shown in FIGS. 3A to 3C, each of the magnet springs 2 includes a back plate 21 axially extending and formed in a radius of curvature in conformity to the inner peripheral wall 11 of the yoke 1, a side plate 22, radially bent from the back plate 21 at one end of both sides of the back plate 21 and radially extending inward toward the center of the yoke 1, which carries thereon the auxiliary pole 5, and a side plate 23, radially bent from the back plate 21 at the other end of both sides of the back plate 21 and radially extending inward toward the center of the yoke 1, which is held in contact with the other surface 42 of the main pole 4. The back plate 21 is formed with rectangular shaped fixture holes 24 at axially spaced positions corresponding to the bulging portions 12, 12 by punching operations. Each of the magnet springs 2 has both ends formed with claw portions 25, 25 at symmetric positions for clamping both end faces 43, 43 of the main pole 4.

The side plate 22, facing the auxiliary pole, takes the form of a structure having the nearly same height (in a radial thickness of the main pole 4) as that of the main pole 4. The side plate 22 is located on a position closer to an intermediate line (see FIG. 3B) by a plate thickness of the auxiliary pole 5 from the intermediate line of an overall width and has two axially spaced positions on which a pair of round holes 26 and 26 is formed. The side plate 23, facing the main pole, has nearly the same height as that of the main pole 4 and assumes a position located in an area ½ of the overall width with respect to the intermediate line. The side plate 23 has an outer side face with which a side face 41 of the main pole 4 is directly held in pressured contact.

Figure 4A:
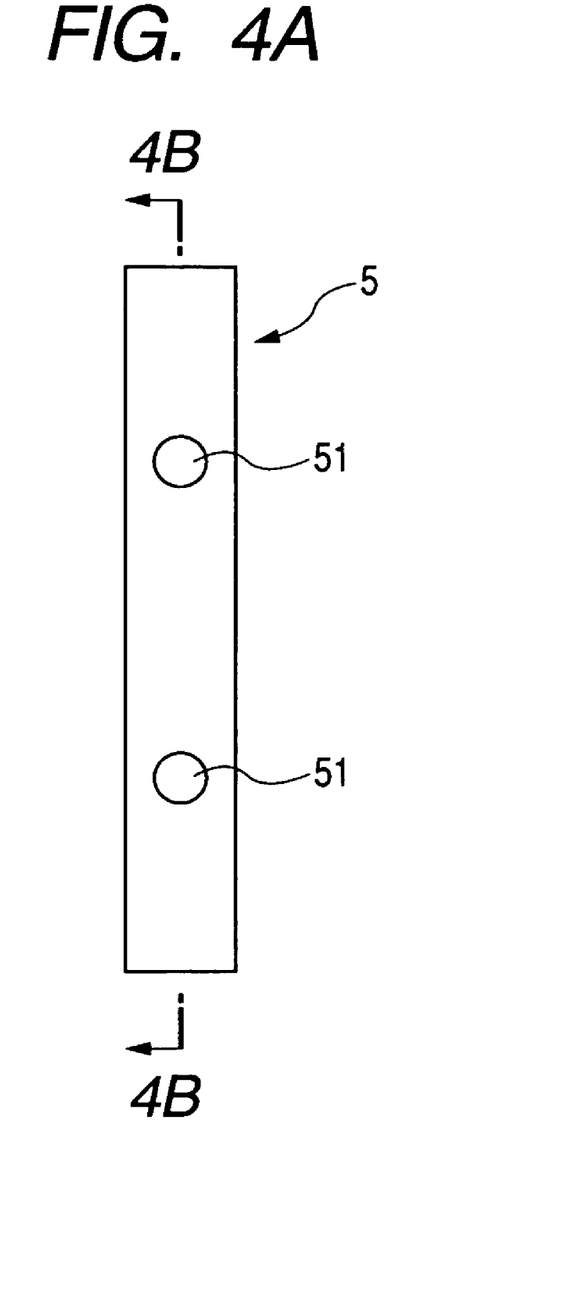
FIG. 4A is a front showing an auxiliary pole.
Figure 4B:
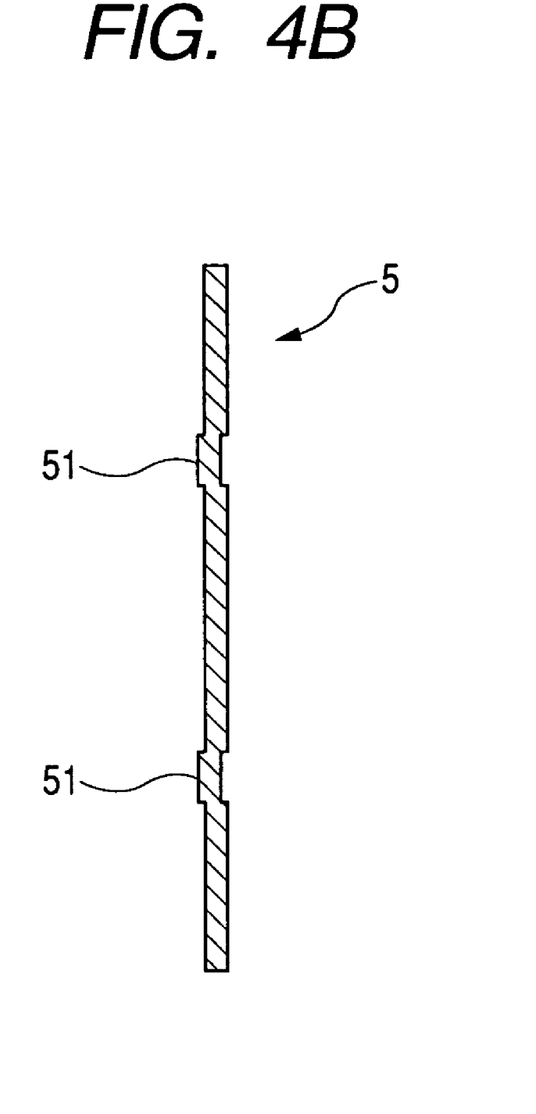
FIG. 4B is a cross-sectional view taken on line 4B-4B of FIG. 4A.

The main pole 4 has a sector shape in cross section and is comprised of a permanent magnet having an outer circumferential wall with the same radius of curvature as that of the inner peripheral wall 11 of the yoke 1. The main pole 4 has an axial length and height nearly equal to an axial length and height of the side plate 22 closer to the auxiliary pole and the side plate 23 closer to the main pole. As shown in FIGS. 4A and 4B, the auxiliary pole 5 is made of an iron plate with a thickness of 2 mm and has the same height and length as those of the side surface 41 of the main pole 4 on the other side thereof and the side plates 22 and 23. The auxiliary pole 5 has axially spaced positions formed with circular protrusions 51 and 51 that are held in mating engagement with a pair of round holes 26 and 26 formed in the side surface 22 facing the auxiliary pole. The protrusions 51 and 51 are formed in embossed shapes, respectively, which may be formed in other forming methods.

Figure 5A:
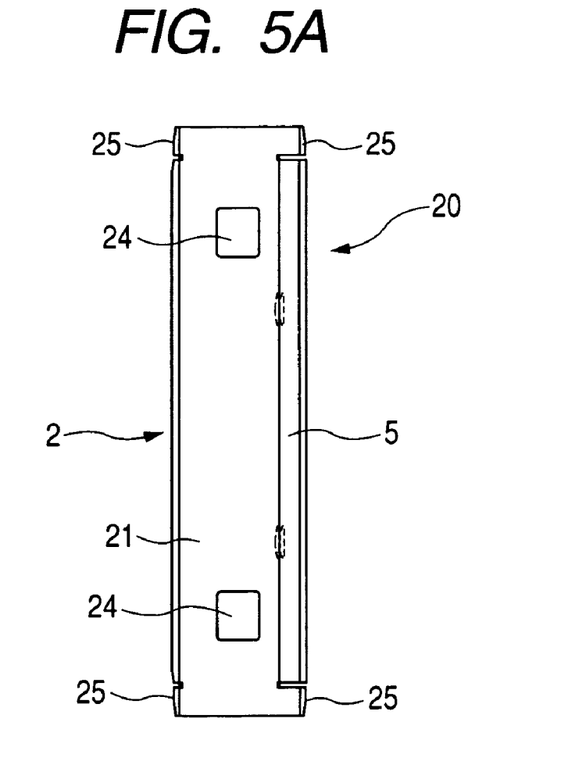
FIG. 5A is a front showing a subassembly.
Figure 5B:
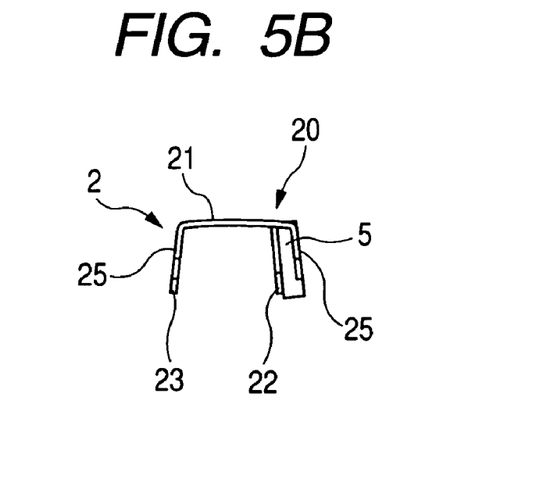
FIG. 5B is a side view showing the subassembly shown in FIG. 5A.

FIGS. 5A and 5B show a magnet spring subassembly 20 composed of the magnet spring 2 and the auxiliary pole 5 assembled to the magnet spring 2 in a unitary structure. Before assembling the yoke assembly 10 onto the yoke 1, the auxiliary pole 5 is attached to the subassembly 20 upon mating engagement between the protrusions 51 and 51 of the auxiliary pole 5 and the round holes 26, 26 formed in the side plate 22 of the magnet spring 2. Under such a status, the subassembly 20 is fixedly secured to the yoke 1. In fixing the subassembly 20, the fixture holes 24 and 24 of the back plate 21 of the magnet spring 2 are fitted to the bulging portions 12 and 12 of the yoke 1. Thereafter, striking the bulging portions 12, 12 resulted in plastic deformations (caulking) to form flattened head portions 120, 120 as shown in FIG. 1.

With the yoke assembly 10 of the present embodiment, the subassembly 20, including the magnet spring 2 to which the auxiliary pole 5 is assembled, is fixedly secured onto the inner peripheral wall 11 of the yoke 1. This results in a capability of easily carrying out the assembling of a yoke assembly of the type, including stator elements composed of only permanent magnets (main poles) in the absence of auxiliary poles, and the assembling of the yoke assembly 10 of the type having the stator elements 3, comprised of the main poles 4 and the auxiliary poles 5, on nearly the same production line. This results in improved productivity, thereby achieving a reduction in manufacturing cost. With the yoke assembly 10 of the present embodiment, the six subassemblies 20 are fixedly secured onto the inner peripheral wall 11 of the yoke 1, after which the six main poles 4 are fitted in fixed places. Thereafter, the claw plates 25 and 25 are bent such that they are brought into engagement with end faces of the main poles 4.

Although the auxiliary pole 5 may be mounted on the side plate 22 in another fixing method, forming convexed portions on one of the auxiliary pole 5 and the side plate 22 while forming concaved portions on the other enables the auxiliary pole 5 and the side plate 22 to be reliably assembled in excellent workability. Like the yoke assembly 10 of the present embodiment, further, the particular structure in which the pair of the round holes 26, 26, formed in the side plate 22, are brought into mating engagement with the circular protrusions 51, 51 formed in the auxiliary pole 5 is mostly practical in view of working ability, assembling ability and durability. In fixedly securing the subassembly 20 onto the yoke 1, the bulging portions 12 and 12 formed in the yoke 1 are brought into mating engagement with the fixture holes 24 and 24 formed in the back plate 21 of the magnet spring 2. Thereafter, the bulging portions 12, 12 are struck for caulking to form the flattened head portions 120 and 120. Such a caulking method is mostly advisable in view of fixing strength and productivity.

Second Embodiment

A yoke assembly of a second embodiment according to the present invention will be described below in detail with reference to FIGS. 6 to 8.

Figure 6:
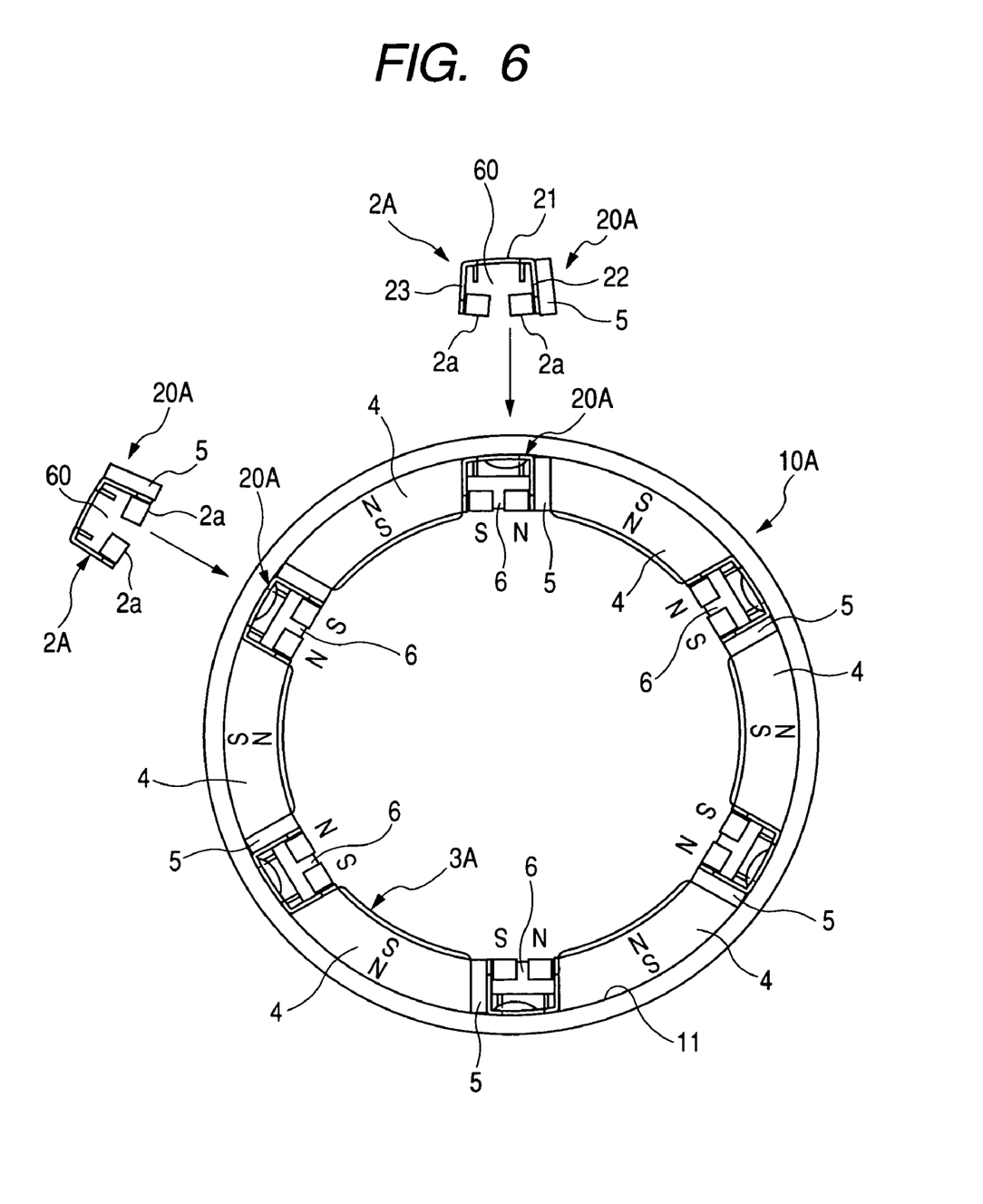
FIG. 6 is a side view showing a yoke assembly of another embodiment according to the present invention for use in a starter motor.

FIG. 6 shows the yoke assembly 10A of the present embodiment. With the present embodiment, the yoke assembly 10A takes the form of a structure including stator elements 3A each of which includes a main pole 4 and an auxiliary pole 5, placed in direct contact with a magnet spring 2A and each of which has a pole-to-pole magnet 6 placed inside the magnet spring 2A.

Figure 7A:
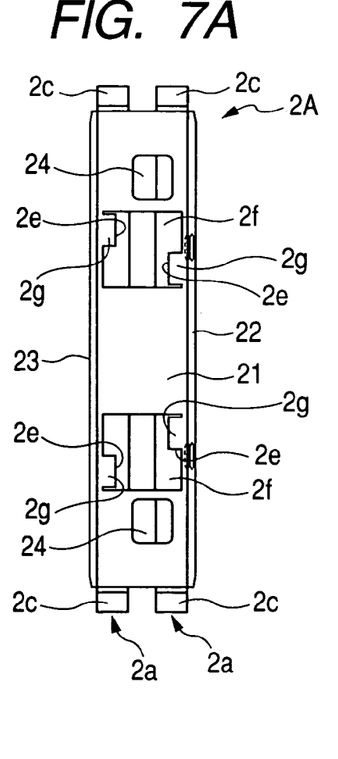
FIG. 7A is a plan view of a magnet spring incorporated in the yoke assembly shown in FIG. 6.
Figure 7B:
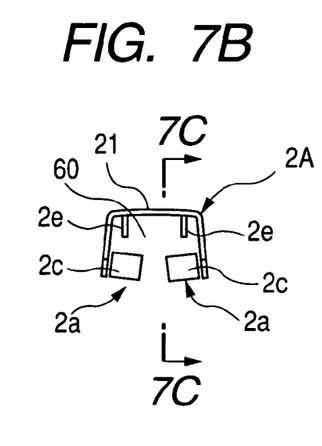
FIG. 7B is a side view of the magnet spring shown in FIG. 7A.
Figure 7C:
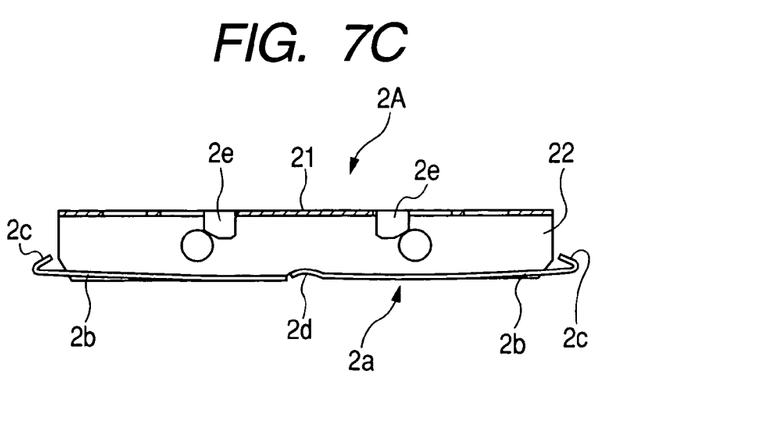
FIG. 7C is a cross-sectional view taken on line 7C-7C of FIG. 7B.

As shown in FIGS. 7 to 7C, each magnet spring 2 has an interior, formed in a mounting chamber 60 for the pole-to-pole magnet 6, and has both side plates 22 and 23. The side plates 22 and 23 have radially inward areas, closer to the center of the yoke assembly 10A, which are formed with ledge segments 2a and 2a circumferentially extending inward from the side plates 22 and 23. The ledge segments 2a and 2a serve as holder sections for holding each pole-to-pole magnet 6 to close an opening portion opened toward the center of the yoke assembly 10A.

The ledge segments 2a and 2a have end portions 2b and 2b, respectively, which are formed with hook-like turndown portions 2c and 2c. The turndown portions 2c and 2c are cut away from the side plates 22 and 23 at lower ends thereof and folded back toward the back plate 21 to some degrees. In addition, the back plate 21 has a middle area formed with first and second pairs of presser limbs 2e and 2e for pressing a radiated outer surface of the pole-to-pole magnet 6. In forming the presser limbs 2e and 2e, a pair of nearly rectangular windows 2f and 2f are formed in the back plate 21 in areas axially inside the fixture holes 24 of the back plate 21. Each of the windows 2f and 2f has a pair of lateral protrusions 2g and 2g, formed at axially spaced positions and laterally extending toward each other, which are radially folded toward the center of the yoke assembly 10A.

The pole-to-pole magnet 6 takes the form of a bar-like member and has a flattened rectangular cross section. The pole-to-pole magnet 6 has a height approximately half the height of the mounting chamber 60 and the nearly same width as that of an overall width of the mounting chamber 60. The ledge segments 2a and 2a resiliently retain both side areas of the pole-to-pole magnet 6 on a radially inward surface facing the center of the yoke assembly 10A and a radially outward surface, facing the inner peripheral wall 11, of the pole-to-pole magnet 6 is pressed with four presser limbs 2e, 2e of the back plate 21. Subsequently, the hook-like turndown portions 2c and 2c are brought into abutting engagement with axial end faces of the pole-to-pole magnet 6 to be retained in the mounting chamber 60 in an area (inside area) closer to the center of the yoke assembly 10A. The use of the pole-to-pole magnet 6 is well known in the art and it is known that the pole-to-pole magnet 6 has the same magnet pole (in a repulsion orientation) as the magnet pole of the neighboring main pole 4 in an inner radiated area thereof, thereby contributing to an increased output.

Figure 8A:
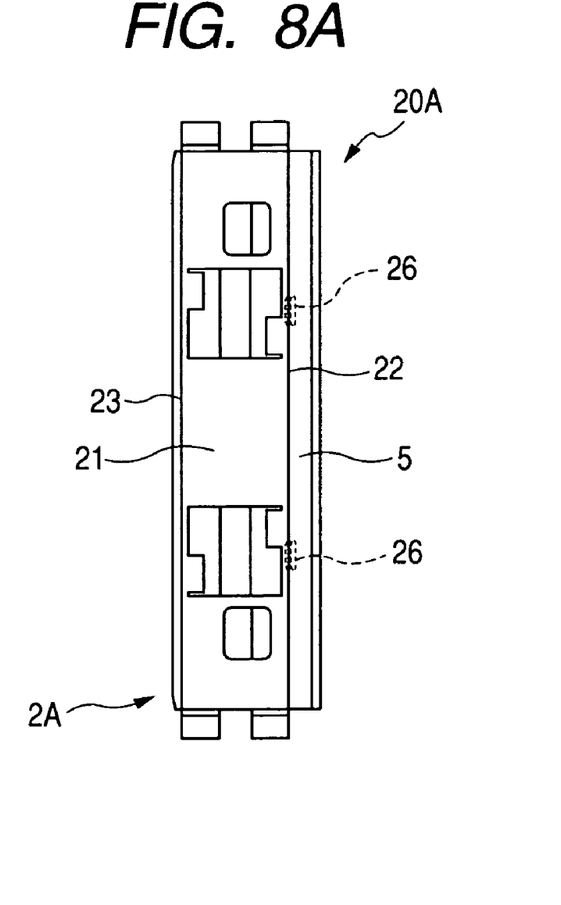
FIG. 8A is a plan view of a subassembly incorporated in the yoke assembly shown in FIG. 6.
Figure 8B:
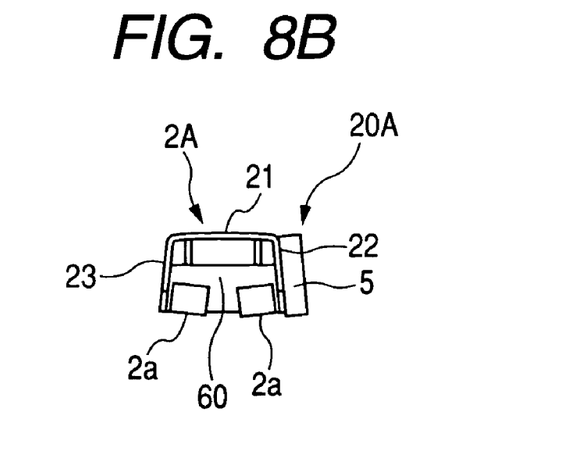
FIG. 8B is a side view of the magnet spring shown in FIG. 8A.

As shown in FIGS. 8A and 8B, the auxiliary pole 5 is assembled to the magnet spring 2A such that the auxiliary pole 5 is held in contact with an outer surface of the side plate 22 in a subassembly 20A, which in turn is assembled to the yoke assembly 10A in a manner similar to that of the first embodiment.

With the yoke assembly 10A of the present embodiment, the side plate 22, facing the auxiliary pole 5, may be preferably formed with a pair of rounded holes 26 each in a depth (corresponding to a plate thickness of the side plate 22) equal to a height of each protrusion of the auxiliary pole 5. This makes it possible to preclude the protrusions 51 of the auxiliary pole 5 from protruding from the side plate 22 to an inside area thereof in nearly zeroed level when mounted onto the side plate 22. Thus, the pole-to-pole magnet can be easily added to the subassembly 20A in the same manner as that of the structure wherein the pole-to-pole magnet is assembled to the magnet spring 2A in the absence of the auxiliary pole 5. This enables a reduction in magnetic fluxes leaked from the main pole, enabling improvement in output performance of the starter motor.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A yoke assembly for a stator of a starter motor, comprising:
   a cylindrical yoke having an inner peripheral wall;
   a plurality of subassemblies including magnet springs and auxiliary poles, with each of the magnet springs and each of the auxiliary poles being assembled to each other in advance after which the subassemblies are fixedly secured to the inner peripheral wall of the yoke at circumferentially and equidistantly spaced positions thereof; and
   a plurality of stator elements, each composed of a main pole made of a permanent magnet, which are fixedly secured to the inner peripheral wall of the yoke and each of which is fixedly retained with adjacent magnet springs, wherein
   each of the magnet springs includes a back plate, fixedly secured to the inner peripheral wall of the cylindrical yoke, and side plates radially extending from the back plate toward the center of the cylindrical yoke, with the back plate and the side plates formed in a nearly U-shape in cross section and opening toward the center of the cylindrical yoke, wherein each of the auxiliary poles is supported with one of the side plates and held in contact with the main pole on a side increasing magnetic fluxes, and
   each of the subassemblies is unitized such that one of each auxiliary pole and each magnet spring has a concaved portion and the other has a convexed portion with the concaved portion and the convexed portion being held in mating engagement with each other.

2. A yoke assembly for a stator of a starter motor, comprising:
   a cylindrical yoke having an inner peripheral wall;
   a plurality of subassemblies including magnet springs and auxiliary poles, with each of the magnet springs and each of the auxiliary poles being assembled to each other in advance after which the subassemblies are fixedly secured to the inner peripheral wall of the yoke at circumferentially and equidistantly spaced positions thereof; and
   a plurality of stator elements, each composed of a main pole made of a permanent magnet, which are fixedly secured to the inner peripheral wall of the yoke and each of which is fixedly retained with adjacent magnet springs, wherein each of the magnet springs includes a back plate, fixedly secured to the inner peripheral wall of the cylindrical yoke, and side plates radially extending from the back plate toward the center of the cylindrical yoke, with the back plate and the side plates formed in a nearly U-shape in cross section and opening toward the center of the cylindrical yoke, wherein each of the auxiliary poles is supported with one of the side plates and held in contact with the main pole on a side increasing magnetic fluxes, and each of the subassemblies is unitized such that each of the auxiliary poles has a protrusion formed by embossing and each of the magnet springs has a mating hole formed by punching with the protrusion and the mating hole being held in mating engagement with each other.

3. The yoke assembly for the stator of the starter motor according to claim 2, wherein:

the inner peripheral wall of the cylindrical yoke has bulging portions formed at equidistantly spaced positions, each of the auxiliary poles is fixedly secured to an outside wall of one of the side plates of each magnet spring in direct contact with the main pole with the protrusion having a height nearly equal to a thickness of the side plate, and the back plate of each magnet spring has a fixture hole held in mating engagement with each of the bulging portions such that the magnet spring is positioned, wherein each of the bulging portions is plastically deformed to cause the back plate to be fixedly secured to the yoke.

4. The yoke assembly for the stator of the starter motor according to claim 2, wherein:

the auxiliary pole is fixedly secured to an outside wall of one of the side plates of each magnet spring in direct contact with the main pole with the protrusion having a height nearly equal to a thickness of the side plate, and each of the magnet springs internally has a mounting chamber, accommodating therein a pole-to-pole magnet, which has an opening portion opened toward the center of the yoke, and a holding section to hold the pole-to-pole magnet in the mounting chamber so as to allow the same to close the opening portion.

5. The yoke assembly for the stator of the starter motor according to claim 1, wherein:

each of the magnet springs has axial end portions formed with claw portions held in abutting engagement with axial end faces of the main pole to fixedly retain the same.

6. A starter motor including a stator incorporating the yoke assembly defined in claim 1.

7. A yoke assembly for a stator of a starter motor, comprising:

a cylindrical yoke having an inner peripheral wall;

a plurality of subassemblies including magnet springs and auxiliary poles, with each of the magnet springs and each of the auxiliary poles being assembled to each other in advance after which the subassemblies are fixedly secured to the inner peripheral wall of the yoke at circumferentially and equidistantly spaced positions thereof; and a plurality of stator elements, each composed of a main pole made of a permanent magnet, which are fixedly secured to the inner peripheral wall of the yoke and each of which is fixedly retained with adjacent magnet springs, wherein:

each of the magnet springs includes a back plate, fixedly secured to the inner peripheral wall of the cylindrical yoke, and side plates radially extending from the back plate toward the center of the cylindrical yoke, with the back plate and the side plates formed in a nearly U-shape in cross section and opening toward the center of the cylindrical yoke, wherein each of the auxiliary poles is supported with one of the side plates and held in contact with the main pole on a side increasing magnetic fluxes, each of the subassemblies is unitized such that each of the auxiliary poles has a protrusion formed by embossing and each of the magnet springs has a mating hole formed by punching with the protrusion and the mating hole being held in mating engagement with each other, the auxiliary pole is fixedly secured to an outside wall of one of the side plates of each magnet spring in direct contact with the main pole with the protrusion having a height nearly equal to a thickness of the side plate, each of the magnet springs internally has a mounting chamber, accommodating therein a pole-to-pole magnet, which has an opening portion opened toward the center of the yoke, and a holding section to hold the pole-to-pole magnet in the mounting chamber so as to allow the same to close the opening portion, and each of the magnet springs has axial end portions formed with ledge segments, respectively, which are held in axial end faces of the pole-to-pole magnet to fixedly retain the same in an axial direction of the yoke.

* * * * *